(12) United States Patent
Ill (10) Patent No.: US 12,345,196 B2
(45) Date of Patent: Jul. 1, 2025

(54) EXHAUST GAS TURBOCHARGER ARRANGEMENT AND INTERNAL COMBUSTION ENGINE

(71) Applicant: Rolls-Royce Solutions GmbH, Friedrichshafen (DE)

(72) Inventor: Stefan Ill, Herdwangen-Schönach (DE)

(73) Assignee: Rolls-Royce Solutions GmbH, Friedrichshafen (DE)

( * ) Notice: Subject to any disclaimer, the term of this patent is extended or adjusted under 35 U.S.C. 154(b) by 0 days.

(21) Appl. No.: 18/606,324

(22) Filed: Mar. 15, 2024

(65) Prior Publication Data
US 2024/0218825 A1 Jul. 4, 2024

Related U.S. Application Data

(63) Continuation of application No. PCT/EP2022/077113, filed on Sep. 29, 2022.

(30) Foreign Application Priority Data

Sep. 29, 2021 (DE) .................... 10 2021 125 235.0
Sep. 29, 2022 (WO) ................. PCT/EP2022/077113

(51) Int. Cl.
*F02B 37/18* (2006.01)
*F02M 26/07* (2016.01)

(52) U.S. Cl.
CPC .......... *F02B 37/183* (2013.01); *F02M 26/07* (2016.02); *F05D 2220/40* (2013.01)

(58) Field of Classification Search
CPC .... F02B 37/183; F02B 37/001; F02B 37/004; F02B 2075/1848; F02B 37/18;
(Continued)

(56) References Cited

U.S. PATENT DOCUMENTS

2014/0182290 A1 7/2014 Bhide et al.
2017/0082017 A1* 3/2017 Nowak .................... F02B 33/40
(Continued)

FOREIGN PATENT DOCUMENTS

DE 29 51 811 A1 11/1980
DE 40 16 2141 C1 11/1991
(Continued)

OTHER PUBLICATIONS

International Search Report and Written Opinion dated Mar. 6, 2023 for International Patent Application No. PCT/EP2022/077113 (13 pages).

*Primary Examiner* — J. Todd Newton
(74) *Attorney, Agent, or Firm* — TAYLOR & EDELSTEIN, PC (57) ABSTRACT

An exhaust-gas turbocharger arrangement, including: three exhaust-gas turbochargers, for being arranged above an engine top side, being a high-pressure exhaust-gas turbocharger, a first low-pressure exhaust-gas turbocharger, and a second low-pressure exhaust-gas turbocharger; a high-pressure stage, with the high-pressure exhaust-gas turbocharger; a low-pressure stage, with the first and second low-pressure exhaust-gas turbochargers; and an exhaust-gas conduit, which includes a high-pressure conduit, a low-pressure conduit, and a high-pressure stage bypass, the low-pressure conduit including a bifurcated pipe between the high-pressure exhaust-gas turbocharger and the first low-pressure exhaust-gas turbocharger and the second low-pressure exhaust-gas turbocharger, the high-pressure conduit including an engine exhaust-gas conduit and a high-pressure stage bypass line, the high-pressure stage bypass line being connected at a first end to the engine exhaust-gas conduit and at a second end to the bifurcated pipe, the high-pressure stage (Continued)

bypass line including a bypass control element in a part running below the bifurcated pipe.

20 Claims, 4 Drawing Sheets

(58) Field of Classification Search
CPC ...... F02B 75/22; F02B 37/007; F02B 37/013; F02B 67/10; F02M 26/07; F05D 2220/40
See application file for complete search history.

(56) References Cited

U.S. PATENT DOCUMENTS

| | | |
|---|---|---|
| 2017/0356399 A1 | 12/2017 | Ntone et al. |
| 2022/0316390 A1 | 10/2022 | Skorupa et al. |

FOREIGN PATENT DOCUMENTS

| | | |
|---|---|---|
| DE | 195 24 566 C1 | 6/1996 |
| DE | 10 2008 052 167 A1 | 4/2010 |
| DE | 10 2012 206 385 A1 | 10/2013 |
| DE | 10 2012 020 243 A1 | 4/2014 |
| DE | 10 2020 100 386 A1 | 7/2021 |
| EP | 0 710 770 A1 | 5/1996 |
| WO | 2004/013472 A1 | 2/2004 |

\* cited by examiner

EXHAUST GAS TURBOCHARGER ARRANGEMENT AND INTERNAL COMBUSTION ENGINE

CROSS REFERENCE TO RELATED APPLICATIONS

This is a continuation of PCT application no. PCT/EP2022/077113, entitled "EXHAUST GAS TURBOCHARGER ARRANGEMENT AND INTERNAL COMBUSTION ENGINE", filed Sep. 29, 2022, which is incorporated herein by reference. PCT application no. PCT/EP2022/077113 claims priority to German patent application no. 10 2021 125 235.0, filed Sep. 29, 2021, which is incorporated herein by reference.

BACKGROUND OF THE INVENTION

1. Field of the Invention

The present invention relates to internal combustion engines, and, more particularly, to exhaust-gas turbocharger arrangements.

2. Description of the Related Art

US 2017/0356399 A1 presents an exhaust-gas turbocharger arrangement having two exhaust-gas turbochargers. In internal combustion engines, it is known for exhaust-gas turbochargers to be used to increase performance; for this purpose, there is generally an extensive range of different options, and, depending on the option, a corresponding large number of possible arrangements of the turbochargers of an exhaust-gas turbocharger arrangement; this applies in particular to cases in which two-stage supercharging is implemented and which involve more than two exhaust-gas turbochargers.

For example, an internal combustion engine with sequential supercharging is known per se, in which, as described in DE 10 2012 206 385 A1, a base exhaust-gas turbocharger and a switchable exhaust-gas turbocharger are provided; here, the switchable exhaust-gas turbocharger is activated or deactivated depending on the position of an exhaust-gas valve or similar exhaust-gas switching device and of a charge-air valve or similar charge-air switching device.

From another configuration in DE 10 2008 052 167 A1, it is known that a closing element can be provided in the exhaust manifold in order that exhaust gases from different cylinders can be supplied separately to a first and to a second high-pressure turbine.

It is also known in principle, in the case of a two-stage supercharging arrangement, that is to say a supercharging arrangement having a high-pressure stage and having a low-pressure stage, to bypass the high-pressure stage using a so-called bypass line.

Furthermore, in variants of this, the exhaust gases may be recirculated or fed directly to the low-pressure stage, or the high-pressure or low-pressure stage may be equipped with a so-called wastegate in order to feed the exhaust gases directly to an exhaust-gas aftertreatment arrangement, for example.

DE 195 24 566 C1 presents, with respect to one specific exhaust-gas turbocharger arrangement, a different internal combustion engine having an arrangement of exhaust-gas turbochargers mentioned here by way of example, said exhaust-gas turbochargers being arranged in a support housing; specifically, in this case, the turbines of the exhaust-gas turbochargers are each situated within the support housing, and the compressors of the exhaust-gas turbochargers are each situated outside the support housing. Via a common exhaust-gas feed, exhaust gas is admitted into the turbines in parallel. After the exhaust gas has passed through the turbines, it is merged in a manifold. The arrangement is selected such that the exhaust gas from mutually opposite turbines is merged. This results in a relatively large structural length of the manifold. The external dimensions of the support housing arise from the number of exhaust-gas turbochargers used, from the size thereof, and from the size of the exhaust-gas feed or the size of the manifold. The manifold presented in DE 195 24 566 C1 is formed in the present case as a bifurcated pipe and is to be understood here by way of example as a basic design form for illustrating what is meant in the present application by a bifurcated pipe, namely, generally a branched pipe with an approximately Y-shaped branching configuration.

In practice, such an exhaust-gas turbocharger arrangement is installed—optionally by way of a support or entirely or partially in a support housing having the feed and discharge lines—on an engine top side of an engine of the internal combustion engine. The structural space requirement of the internal combustion engine is thus enlarged. An increase of the structural space requirement can be a problem in particular, but not only, in the case of an internal combustion engine for a ship or a military vehicle.

The exhaust-gas turbochargers in DE 40 16 214 C1 are fastened, adjacent to one another, to a side wall of gas-tight box, the turbine housings of the exhaust-gas turbochargers being situated within the box and the compressor housings of the exhaust-gas turbochargers being situated outside the box. The exhaust-gas turbochargers are switchable at the exhaust-gas side by way of an exhaust-gas flow divider, which is arranged at the exhaust-gas outlet of the central exhaust-gas turbocharger and above the latter. Single-stage charge-air compression by way of only a high-pressure exhaust-gas turbocharger, or two-stage charge-air compression by series connection of the high-pressure exhaust-gas turbocharger and the two low-pressure exhaust-gas turbochargers, is implemented depending on the position of the exhaust-gas flow divider. Two-stage supercharging by way of a high-pressure exhaust-gas turbocharger that can be used depending on the position of the exhaust-gas flow divider is known in principle; it is however also the case here that the arrangement of the exhaust-gas turbochargers has potential for improvement.

An advantageous arrangement of three exhaust-gas turbochargers—arranged, in simple terms, in a triangular layout and symmetrically in a plane—has proven successful; this is proposed in WO 2004/013472 A1 for a different internal combustion engine having a first and a second exhaust-gas turbocharger that are arranged in a common support housing. Provision is made for two exhaust-gas turbochargers to be arranged such that the two charger axes lie at an angle with respect to one another in an angle range of 550 to 100°, and in the same plane. In the case of an internal combustion engine, a third exhaust-gas turbocharger is additionally arranged within the support housing. The charger axis of the third exhaust-gas turbocharger lies in the same plane as the charger axes of the first and of the second exhaust-gas turbocharger. The charger axis of the third exhaust-gas turbocharger bisects the angle into two equal angle ranges, that is to say, for example, 50°. Non-compressed air is fed, via a branch from a first and a second air feed, to the compressor wheel of the third exhaust-gas turbocharger. The exhaust gas that flows through the third exhaust-gas turbocharger, via the turbine wheel thereof, is introduced into the manifold. The charge air that is conveyed by the compressor wheel is fed to the common charge-air conduit; this is arranged here approximately centrally in the V-shaped free space between the cylinders arranged in a V shape, i.e. in the cylinder V of the engine.

The exhaust gas from this centrally arranged exhaust-gas turbocharger is conducted to the common manifold. The exhaust line sections for the first and the second exhaust-gas turbocharger are equipped with an exhaust-gas valve for switching in the context of sequential supercharging. Two exhaust-gas valves for deactivating the first and the second exhaust-gas turbocharger are arranged in the manifold. In this way, merging of the two exhaust-gas flows with low turbulence is furthermore achieved with a short structural length of the manifold and compact external dimensions of the internal combustion engine.

EP 0 710 770 A1 has disclosed an internal combustion engine having a support housing and having an exhaust-gas turbocharger arrangement with three exhaust-gas turbochargers. The charger axes of the three exhaust-gas turbochargers lie in the same plane; the exhaust-gas outlet of the first turbine housing is connected to the exhaust-gas inlet of the second and third turbine housings. The second and third exhaust-gas turbochargers are arranged symmetrically on opposite sides of the high-pressure exhaust-gas turbocharger, with the charger axes thereof lying at an angle with respect to one another. Via an upwardly leading exhaust-gas line, the exhaust gas, after flowing through the second and third exhaust-gas turbochargers, flows into a manifold line. The compressor housings may be oriented at any desired angle in relation to the support housing.

An exhaust-gas turbocharger arrangement for an internal combustion engine and for arranging above the engine top side of the engine thus includes three exhaust-gas turbochargers for supercharging the internal combustion engine—for example in the manner of EP 0 710 770 A1—wherein the exhaust-gas turbocharger arrangement has a high-pressure stage, which has a high-pressure exhaust-gas turbocharger, a low-pressure stage, which has a first and a second low-pressure exhaust-gas turbocharger, and an exhaust-gas conduit, having a high-pressure conduit and having a low-pressure conduit.

DE 10 2012 020 243 A1 also presents a turbocharger arrangement having three exhaust-gas turbochargers, having a support housing for the exhaust-gas turbocharger arrangement for the purposes of fastening to an internal combustion engine, having a fastening region for the mechanical fastening of the support housing to an internal combustion engine, and having a first fastening flange for the mechanical fastening of a turbine of a high-pressure exhaust-gas turbocharger to the support housing, having a second fastening flange for the mechanical fastening of a turbine of a first low-pressure exhaust-gas turbocharger to the support housing, and having a third fastening flange for the mechanical fastening of a turbine of a second low-pressure exhaust-gas turbocharger to the support housing.

It is furthermore apparent that the arrangement of actuators—such as the closing element in the form presented in DE 10 2008 052 167 A1—close to a cylinder bank of the engine has disadvantages, even though this may be favorable from a structural space aspect. In particular for the arrangement of valve elements that are used for splitting-up or bypassing purposes for exhaust-gas flows close to the point at which the exhaust gas is discharged from the engine bay, it has been found that these are typically subject to intense vibration loads. This gives rise to relatively high loads not only on the actuator itself but in particular on the rotating and movable parts of the actuator such as the valve. This load is particularly pronounced in particular owing to an external position of the actuator—on the edge of the engine block—as a result of the relatively large movement amplitudes that occur there. Furthermore, in the case of a position close to the cylinders, relatively high pulsation forces owing to exhaust-gas pulsations are more intense the closer an actuator, or an exhaust-gas valve, is positioned to the cylinder bank.

It is therefore highly challenging to realize a compact design for an exhaust-gas turbocharger arrangement which is firstly optimized in terms of stability with respect to continuous dynamic loads but which secondly also allows integration of an actuator, in particular of an exhaust-gas valve, and in the case of which a vibration load—in particular resulting from exhaust-gas pulsations or a valve position—is relatively low.

It has been found that even low component loads, but in particular in this case relatively high component loads, such as occur in the prior art—as encountered for example in the case of the closing element of DE 10 2008 052 167 A1—can have the effect, not only for the moving parts of the actuator but also generally for bearing arrangements and coupling rods in the turbocharger arrangement per se, that this relatively expensive use of components nevertheless leads to a reduction of the component service life.

US 2014/0182290 A1 presents an exhaust-gas turbocharger arrangement; here, an exhaust-gas housing for use with the turbocharger includes a hollow body and has two mutually opposite walls which extend along a first and a second main dimension of the hollow body and which are mutually spaced by a relatively small dimension of the hollow body, the hollow body defining a plenum and an inlet nozzle that opens into the plenum along the relatively small dimension of the hollow body. The housing furthermore includes an outlet nozzle that opens from the plenum along one of the main dimensions of the hollow body.

An inlet intermediate stage conduit assembly shown in FIG. 3 of said document includes a high-pressure turbine inlet channel and an inlet bypass distributor that connects the high-pressure turbine inlet channel to the outlet manifold. The inlet intermediate stage conduit assembly also includes a turbine intermediate stage conduit that connects the outlet of the high-pressure turbine and the inlet bypass distributor to the low-pressure turbine. The inlet bypass distributor is connected via a bypass valve to the turbine intermediate stage conduit and to a generally napiform flow divider/ejector, as shown in FIG. 5 of US 2014/0182290 A1. The entire inlet intermediate stage conduit arrangement is installed on a diesel engine by way of an intermediate stage conduit bracket and by way of screws which are inserted through eyelets which are formed integrally on the high-pressure turbine inlet conduit. This exhaust-gas turbocharger arrangement also still has potential for improvement.

It is desirable to keep the life-cycle costs (LCC) relating to an exhaust-gas turbocharger arrangement as low as possible.

What is needed in the art is to address this, and what is needed in the art is a device, specifically an exhaust-gas turbocharger arrangement and an internal combustion engine, which, including three exhaust-gas turbochargers, and having a high-pressure stage and a low-pressure stage, is firstly of compact and stable design and furthermore keeps component loads on an actuator for a high-pressure stage bypass low. In particular, it is sought to specify an exhaust-gas turbocharger arrangement which—while nevertheless realizing the desired proximity of the exhaust-gas turbocharger arrangement to the engine block—makes it possible, for a high-pressure stage bypass line, to minimize the load on a bypass control element of said exhaust-gas turbocharger arrangement having three exhaust-gas turbochargers in a low-pressure stage and a high-pressure stage.

SUMMARY OF THE INVENTION

The present invention relates to an exhaust-gas turbocharger arrangement, and to an internal combustion engine having the exhaust-gas turbocharger arrangement. An exhaust-gas turbocharger of said type for an internal combustion engine includes three exhaust-gas turbochargers for supercharging the internal combustion engine and for arrangement above the engine top side of the engine, the exhaust-gas turbocharger arrangement having a high-pressure stage, which has a high-pressure exhaust-gas turbocharger, having a low-pressure stage, which has a first and a second low-pressure exhaust-gas turbocharger, and having an exhaust-gas conduit, which has a high-pressure conduit and a low-pressure conduit, wherein the exhaust-gas conduit furthermore has a high-pressure stage bypass. Thus, in the present case, the three exhaust-gas turbochargers include the first and the second low-pressure exhaust-gas turbocharger and the high-pressure exhaust-gas turbocharger.

The present invention proceeds from an exhaust-gas turbocharger for an internal combustion engine, including three exhaust-gas turbochargers for supercharging the internal combustion engine and for arrangement above the engine top side of the engine, the exhaust-gas turbocharger arrangement having a high-pressure stage, which has a high-pressure exhaust-gas turbocharger, having a low-pressure stage, which has a first and a second low-pressure exhaust-gas turbocharger, and having an exhaust-gas conduit, which has a high-pressure conduit and a low-pressure conduit.

Here, the present invention relates to an exhaust-gas turbocharger arrangement, wherein the exhaust-gas conduit furthermore has a high-pressure stage bypass.

Provision is made here whereby
the low-pressure conduit has a bifurcated pipe between the high-pressure exhaust-gas turbocharger of the high-pressure stage and the first and second low-pressure exhaust-gas turbocharger of the low-pressure stage, and
the high-pressure conduit has an engine exhaust-gas conduit and a high-pressure stage bypass line, the high-pressure stage bypass line being connected at a first end to the engine exhaust-gas conduit and at a second end to the bifurcated pipe.

According to the present invention, the high-pressure stage bypass line has a bypass control element in a part running below the bifurcated pipe.

Since, in particular, the exhaust-gas conduit is discussed as an embodiment of the present invention below, the exhaust-gas-side conduit of the exhaust-gas turbocharger arrangement will be referred to for simplicity as a "high-pressure conduit" and a "low-pressure conduit", possibly without specifically stating that this refers to the conduit for the exhaust gas; that is to say, a "high-pressure conduit" refers to the high-pressure part of the exhaust-gas conduit, and a "low-pressure conduit" refers to the low-pressure part of the exhaust-gas conduit. In other words, it will specifically be pointed out in individual cases where a charge-air conduit is meant; in general, primarily the exhaust gas conduit will be described.

The bifurcated pipe is in this case generally a branched pipe, particularly advantageously with an approximately Y-shaped branching configuration. The bifurcated pipe connects the exhaust-gas side of the high-pressure stage—at the side of the single connector of the bifurcated pipe—to the low-pressure stage—at the side of the double connector of the bifurcated pipe; specifically, the exhaust-gas-side outlet of the high-pressure turbine (of the high-pressure exhaust-gas turbocharger of the high-pressure stage) is connected simultaneously to the exhaust-gas-side inlet of the first and of the second low-pressure turbine (of the first and of the second low-pressure exhaust-gas turbocharger of the low-pressure stage) by way of the bifurcated pipe.

The measure according to the present invention assumes that the high-pressure conduit—that is to say the high-pressure part of the exhaust-gas conduit—has an engine exhaust-gas conduit and a high-pressure stage bypass line. Here, the high-pressure stage bypass line is connected at a first end to the engine exhaust-gas conduit and at a second end to the bifurcated pipe.

It has now been found that the measure according to the present invention, whereby said high-pressure stage bypass line has a bypass control element in a part running below the bifurcated pipe, has considerable advantages with regard to what is needed in the art. With regard in particular to a control element—such as the closing element in the high-pressure stage bypass line—the present invention leads to a considerable reduction of the load on the control element; this being the case despite the fact that the bypass control element is still arranged relatively close to the engine block.

Firstly, in the compact design of the exhaust-gas turbocharger arrangement having three turbochargers, a relatively long equalization and settling path is realized in the engine exhaust-gas conduit. Furthermore, with the central arrangement of the bypass control element, that is to say while avoiding long lever arms, it has however been possible to keep the load on said closing element in the bypass, or similar bypass control element(s) and other actuator elements in said high-pressure stage bypass line, relatively low.

It is particularly advantageously thus possible to reduce the life cycle costs (LCC). The exhaust-gas turbocharger arrangement, or the internal combustion engine having the exhaust-gas turbocharger arrangement having three exhaust-gas turbochargers, furthermore makes it possible to implement the arrangement thereof—optionally in a support housing—with compact external dimensions, and to nevertheless ensure adequate cooling with low susceptibility to failure.

The present invention also relates to an internal combustion engine, having an engine and having an exhaust-gas turbocharger arrangement according to the invention.

The exhaust-gas turbocharger arrangement designed according to the present invention is provided for arrangement above the engine top side of the engine and is furthermore designed for supercharging the internal combustion engine and is connected via a feed air line to the feed air side of at least one cylinder bank of the engine and is connected via the engine exhaust-gas conduit to the exhaust air side of the at least one cylinder bank of the engine. Here, the exhaust-gas turbocharger arrangement has a high-pressure stage, which has a high-pressure exhaust-gas turbocharger, a low-pressure stage, which has a first and a second low-pressure exhaust-gas turbocharger, and an exhaust-gas conduit, which has a high-pressure conduit and a low-pressure conduit, wherein the exhaust-gas conduit furthermore has a high-pressure stage bypass, specifically substantially the high-pressure stage bypass line.

In one advantageous refinement, provision is made whereby the bypass control element in the part running below the bifurcated pipe is a bypass valve that is designed to prevent a flow of exhaust gas through the high-pressure stage bypass line.

In one advantageous refinement of the exhaust-gas turbocharger arrangement, provision is made whereby the bypass control element has a control element actuator which, arranged under the high-pressure stage bypass line on a side facing away from the bifurcated pipe, is functionally connected to the bypass control element. This has proven to be an optional position for the actuator, such that lever forces are avoided; in particular, with regard to this advantage, the refinement is fundamentally optional over a lateral position of the actuator, but in particular in relation to an external position of the actuator.

In one advantageous refinement of the exhaust-gas turbocharger arrangement, provision is made whereby the bypass control element has cooling connections for the control element actuator, the cooling connections being arranged in a side facing away from the engine top side. The lateral arrangement of the cooling connections is—like the arrangement of the actuator—central in relation to the engine; this not only makes the stated advantages possible but also allows a cooling line configuration with a reduced line length in relation to an external position of the actuator.

In one advantageous refinement of the exhaust-gas turbocharger arrangement, provision is made whereby exhaust gas can be discharged from the engine, and fed to the exhaust-gas turbocharger arrangement, by way of the engine exhaust-gas conduit, wherein
  the motor exhaust-gas conduit is adjoined by a high-pressure exhaust-gas feed by way of which exhaust gas can be conducted in the high-pressure region to the high-pressure exhaust-gas turbocharger. This has the advantage that exhaust gas can be fed at high pressure, over a relatively short conduit path and thus with relatively little pressure loss, to the high-pressure turbine; efficiency is thus improved in relation to a relatively long high-pressure exhaust-gas feed.

In one advantageous refinement of the exhaust-gas turbocharger arrangement, provision is made whereby the bifurcated pipe forms a low-pressure exhaust-gas feed to the first and the second low-pressure exhaust-gas turbocharger, by way of which low-pressure exhaust-gas feed exhaust gas can be fed from the high-pressure exhaust-gas turbocharger to the first and the second low-pressure exhaust-gas turbocharger simultaneously.

In one advantageous refinement of the exhaust-gas turbocharger arrangement, provision is made whereby, by way of the high-pressure stage bypass line that is connected to the engine exhaust-gas conduit, exhaust gas can be fed in the high-pressure region, bypassing the high-pressure exhaust-gas turbocharger, directly to the bifurcated pipe to the low-pressure stage.

With the bifurcated pipe and the high-pressure stage bypass line connected to the engine exhaust-gas conduit, a low-pressure and a high-pressure exhaust-gas conduit for a compact exhaust-gas turbocharger arrangement having three turbochargers of a low-pressure and a high-pressure stage can be implemented in an optional and compact form.

In one advantageous refinement of the exhaust-gas turbocharger arrangement, provision is made whereby the engine exhaust-gas conduit is formed at the engine top side as a bridge line above the engine top side between the A cylinder bank and the B cylinder bank, in particular as a bow-shaped bridge line, optionally in a U shape, between the A cylinder bank and B cylinder bank. This structural form of the engine exhaust gas conduit as a bridge line has proven to be advantageous. The high-pressure exhaust-gas feed advantageously adjoins the region of a limb or of a limb bend of the U-shaped, bow-shaped bridge line, and/or the high-pressure stage bypass line advantageously adjoins the region of a base of the U-shaped, bow-shaped bridge line. The bypass line advantageously leads upwardly, in particular obliquely upwardly, away from the bridge line, so as to point away from the engine top side, to the bifurcated pipe.

In one advantageous refinement of the exhaust-gas turbocharger arrangement, provision is made whereby the high-pressure stage bypass line runs in a spatial region between the A cylinder bank and the B cylinder bank so as to remain below the bifurcated pipe. In this region between the A cylinder bank and the B cylinder bank, laterally acting forces resulting from a tilting movement of the engine are low, because the tilting movement amplitudes are intrinsically lower than in the external region of the engine; correspondingly, lever forces on a high-pressure stage bypass line are lower in the spatial region than in the external region of the engine.

In one advantageous refinement of the exhaust-gas turbocharger arrangement, provision is made whereby the high-pressure stage bypass line leads away from the center of the bridge line and/or adjoins the branching point of the bifurcated pipe. This arrangement, which is, so to speak, on the engine axis or along the engine shaft between the A-bank and B-bank, minimizes lever forces to a particularly optional degree.

In one advantageous refinement of the exhaust-gas turbocharger arrangement, provision is made whereby the high-pressure stage bypass line, together with the bifurcated pipe, spans a plane that lies substantially perpendicular to the engine top side, the high-pressure stage bypass line, together with the bifurcated pipe, optionally enclosing an angle of inclination that lies in the range between 30° and 60°, optionally is greater than 45°. This dimension advantageously arises taking into consideration a structural height and compactness of the exhaust-gas turbocharger arrangement.

In one advantageous refinement of the exhaust-gas turbocharger arrangement, provision is made whereby the bifurcated pipe has a substantially Y-shaped form as seen in a plan view, and a bridge line of the engine exhaust-gas conduit, together with the high-pressure stage bypass line, has a substantially T-shaped form as seen in a plan view, a stem of the Y-shaped form and a stem of the T-shaped form lying substantially one below the other in a plane, in particular with branches of the Y-shaped form and bars of the T-shaped form situated on opposite sides.

In a further advantageous refinement of the exhaust-gas turbocharger arrangement, provision is made whereby each exhaust-gas turbocharger includes a compressor wheel and a turbine wheel that rotate about a common charger axis, the first and second and third exhaust-gas turbocharger being arranged such that their charger axes lie in the same plane, specifically
  with the axis of the bifurcated pipe running parallel to the plane and the high-pressure stage bypass line running transversely with respect to the plane, the plane running substantially parallel to the engine top side, in particular transversely with respect to a surface. This arrangement of the exhaust-gas turbocharger on the corners of a triangle optimizes an intrinsically stable and compact exhaust-gas turbocharger arrangement. In this regard, it has proven to be particularly advantageous if the two charger axes of the first and of the second low-pressure exhaust-gas turbocharger lie at an angle with respect to one another in an angle range of between 550 and 100°, and the charger axis of the high-pressure exhaust-gas turbocharger lies within the angle range.

Embodiments of the present invention will now be described below on the basis of the drawings in relation to the prior art. The drawings are not necessarily intended to represent the embodiments to scale; rather, the drawings take a schematic and/or slightly distorted form where useful for explanatory purposes. With regard to additions to the teachings which are directly evident from the drawings, reference is made to the relevant prior art. Here, it should be taken into consideration that a wide variety of modifications and changes concerning the form and the detail of an embodiment can be made without departing from the general idea of the present invention. The features of the present invention which are disclosed in the description, in the drawing and in the claims may be essential both individually and in any desired combination for the refinement of the present invention. In addition, the scope of the present invention covers all combinations of at least two of the features disclosed in the description, the drawing and/or the claims. The general idea of the present invention is not restricted to the exact form or the detail of the optional embodiment shown and described below or limited to subject matter which would be restricted by comparison with the subject matter claimed in the claims. Where dimensional ranges are specified, values lying within the stated limits are also intended to be disclosed, and able to be used and claimed as desired, as limit values. Further advantages, features and details of the present invention will emerge from the following description of the optional embodiments and with reference to the drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplification set out herein illustrate at least one embodiment of the invention, and such exemplifications are not to be construed as limiting the scope of the invention in any manner.

DETAILED DESCRIPTION OF THE INVENTION

Figure 1:
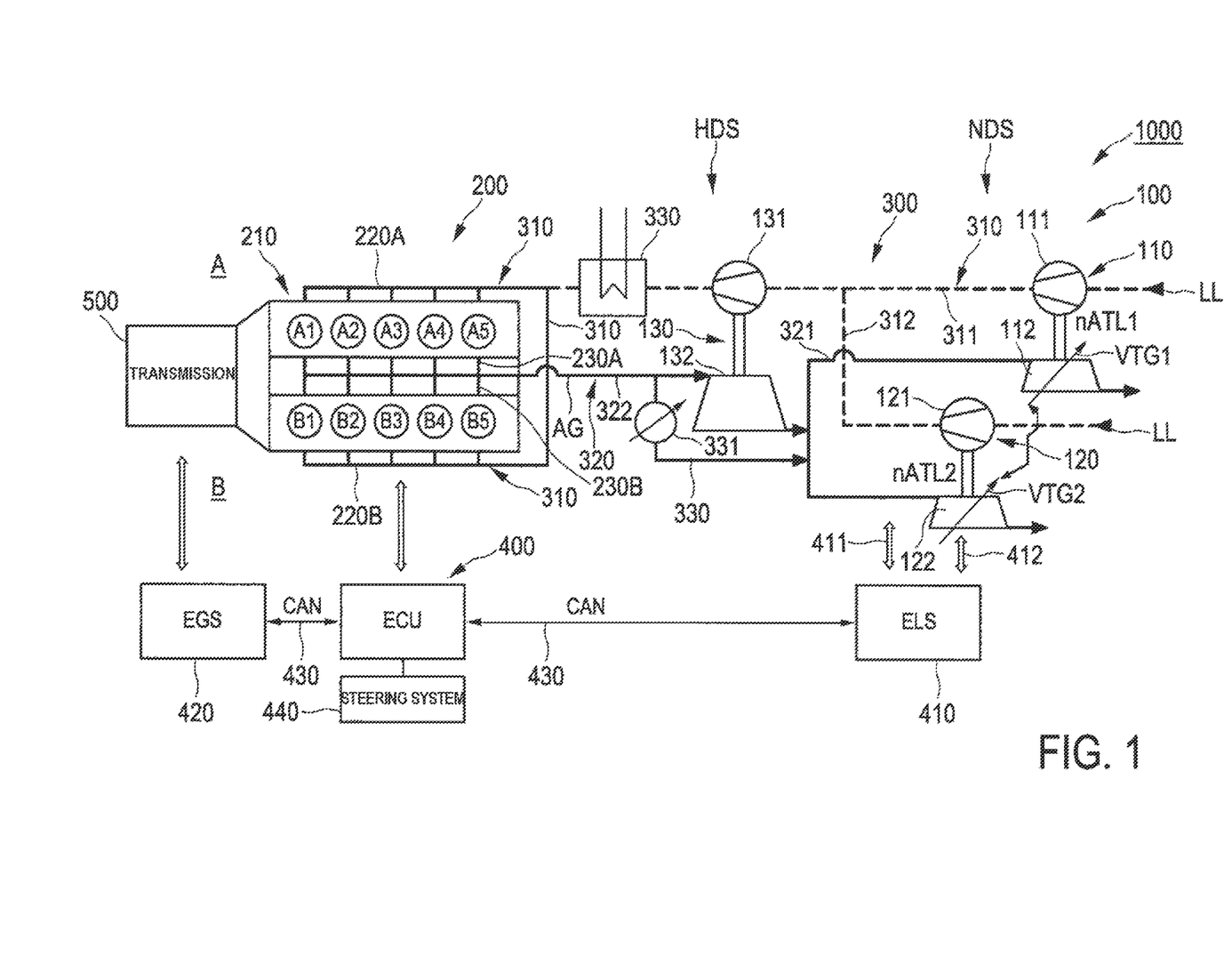
FIG. 1 is a schematic illustration of an optional embodiment of an internal combustion engine having an engine and having an exhaust-gas turbocharging group, for the purposes of illustrating a high-pressure stage, which has a high-pressure exhaust-gas turbocharger, a low-pressure stage, which has a first and a second low-pressure exhaust-gas turbocharger, and an exhaust-gas conduit, which has a high-pressure conduit and a low-pressure conduit, wherein the exhaust-gas conduit furthermore has a high-pressure stage bypass.

FIG. 1 schematically shows an internal combustion engine 1000 having an exhaust-gas turbocharging group 100, having an engine 200, and having a charger conduit system 300 designed for conducting exhaust gas AG and charge air LL; a transmission 500 is coupled to a power side of the engine 200. A vehicle controller ECU, 400 and a bus system having a data bus CAN 430 are provided for the control of the internal combustion engine; FIG. 1 furthermore schematically shows the availability of signaling on a data bus 430 CAN. The engine control unit 400, an electronic charger control module ELS, 410 and an electronic transmission control module EGS, 420 are connected to the data bus 430, and a steering system controller STEERING SYSTEM, 440 is also connected via the data bus CAN, 430. Data relating to the charger operating state, the transmission operating state and the steering system operating state are thus available on the data bus CAN, 430.

In the present case, the engine 200 is formed with an engine block 210 and with a V arrangement of ten cylinders, specifically cylinders A1 to A5 on an A side "A" of the A-bank of the engine block 210, and cylinders B1 to B5 on a B side "B" of the B-bank of the engine block 210.

With regard to the embodiment, illustrated in FIG. 2 to FIG. 5, of an exhaust-gas turbocharger arrangement 1 for realizing the exhaust-gas turbocharging group 100, schematically shown here, on an engine 200 and the charger conduit system 300, note the following: the individual details shown in FIG. 1 need not necessarily all be realized in the exhaust-gas turbocharger arrangement 1 on the engine 2 of the internal combustion engine as described in FIG. 2 to FIG. 5. Deviations and variations may rather expediently be provided.

The embodiment of an exhaust-gas turbocharger arrangement 1 as described in FIG. 2 to FIG. 5 may also be used on a 12-cylinder engine and on other engines with fewer cylinders, for example a 10-cylinder engine as illustrated here, or on other engines with more cylinders, for example a 16-cylinder or 24-cylinder engine.

Via the exhaust-gas turbocharging group 100 and the charger conduit system 300, charge air can be fed to the cylinders via charge-air manifolds 220A, 220B connected to the engine block 210. The charge air LL is compressed in the cylinders together with injected fuel in a particular injection quantity qV, and serves for the combustion of the fuel. The combustion products are discharged as exhaust gas AG via exhaust manifolds 230A, 230B back into the charger conduit system 300.

Specifically, charge air LL in a charge-air conduit 310 is conducted to the charge-air manifolds 220A, 220B via branch lines that are not illustrated in detail. The exhaust gas AG is received into the charger conduit system 300 again from the exhaust manifolds 230A, 230B in an exhaust-gas conduit 320 and is discharged via the exhaust-gas turbocharging group 100 to the surroundings. According to the concept of the present invention, the exhaust-gas turbocharging group 100 is advantageously realized as the exhaust-gas turbocharger arrangement 1 of FIG. 2 to FIG. 5.

Specifically, the exhaust-gas turbocharging group 100 is formed as a two-stage supercharging arrangement having a low-pressure stage NDS, which has a first exhaust-gas turbocharger 110, optionally in the form of a base exhaust-gas turbocharger, and a second exhaust-gas turbocharger 120, optionally in the form of a switchable exhaust-gas turbocharger. The switchable exhaust-gas turbocharger is then activatable in addition to the base exhaust-gas turbocharger, which is in principle operated permanently, by way of a switching device (not illustrated). For this purpose, the switching device may have a charge-air switching device, equipped with a first closed-loop controller, in a switchable line section of the charge-air conduit that branches off from a base charge-air conduit. Furthermore, an exhaust-gas switching device assigned to the switchable turbine and having a second closed-loop controller could be provided, in a switchable exhaust-gas line section that branches off from a base exhaust-gas line.

The first exhaust-gas turbocharger 110 (ATL1) has, as a first low-pressure exhaust-gas turbocharger, a first low-pressure compressor 111 for charge air LL and a first low-pressure turbine 112, in the present case with variable turbine geometry VTG1, for exhaust gas AG. The second exhaust-gas turbocharger 120 (ATL2) has, as a second low-pressure exhaust-gas turbocharger, a second low-pressure compressor 121 and a second low-pressure turbine 122, in the present case also with variable turbine geometry VTG2, for exhaust gas AG.

For example, the first and the second closed-loop controller, and control elements for the variable turbine geometry VTG1, VTG2, are connected via corresponding control lines to a module of the vehicle controller 400, specifically to an electronic charger controller ELS, which is in turn connected to the vehicle controller 400 via a data bus CAN. For this purpose, corresponding control lines 411, 412 of the data bus CAN are provided between the module 410 and the closed-loop controllers.

In the present case, with regard to the first exhaust-gas turbocharger 110 as a first low-pressure exhaust-gas turbocharger, charge air LL is fed via a first charge-air conduit 311 to a first compressor 111, which is driven by way of a low-pressure turbine 112 that is driven by exhaust gas AG in the first exhaust-gas conduit 321. In the present case, with regard to the second exhaust-gas turbocharger 120 as a second low-pressure exhaust-gas turbocharger, charge air LL is fed via a second charge-air conduit 312 to a second compressor 121, which is driven by way of a low-pressure turbine 122 that is driven by exhaust gas AG in the second exhaust-gas conduit 322.

The compressed charge air LL is fed onward via the charge-air conduit 310 to a third compressor 131, which is driven by way of a high-pressure turbine 132 that is driven by exhaust gas AG in the exhaust-gas conduit 320; the third compressor 131 and the high-pressure turbine 132 form a third exhaust-gas turbocharger 130 (ATL3) as a high-pressure exhaust-gas turbocharger.

The compressed charge air LL is cooled in a heat exchanger 330 and is fed onward in the charge-air conduit 310, in the manner discussed above, to the charge-air manifolds 220A, 220B and the cylinders A1 to A5 and B1 to B5.

If supercharging with relatively low charge pressure is intended, or if it is sought to increase a scavenging gradient of the engine or perform similar optimization or adaptation of the supercharging, the high-pressure stage HDS can be bypassed; that is to say exhaust gas AG can be fed directly to the low-pressure stage NDS. For this purpose, the exhaust-gas conduit 320 furthermore has a high-pressure stage bypass 330 having a bypass switching device 331. For example, the bypass switching device 331 and other control elements for controlling the high-pressure and low-pressure stages HDS, NDS are connected via corresponding control lines to a module of the vehicle controller 400, specifically in particular of the electronic charger controller ELS, which is in turn connected to the vehicle controller 400 via the data bus CAN.

In the case of the aforementioned option, a base exhaust-gas turbocharger 110 can be operated with varying rotational speeds nATL1. A switchable exhaust-gas turbocharger 120 may initially be operated at idle, with exhaust gas AG being conducted via the switchable turbine 122 and without charge air LL being conducted via the switchable compressor 121, with an increasing rotational speed nATL2. For this purpose, the exhaust-gas switching device assigned to the switchable turbine 122 opens. The switchable exhaust-gas turbocharger 120 can thus initially be accelerated relatively quickly without any compressor work, and exhaust gas AG can nevertheless be effectively discharged as required. With further increasing exhaust-gas volume flow, the switching device assigned to the switchable compressor 121 can also be opened, and the operation of the switchable exhaust-gas turbocharger 120 is switched to compression of air, that is to say load operation. The switching of the switchable exhaust-gas turbocharger 120—that is to say specifically the opening of the charge-air valve or similar charge-air switching device or of the exhaust-gas valve or similar exhaust-gas switching device—is performed smoothly and with relatively little charge pressure loss.

Figure 2:
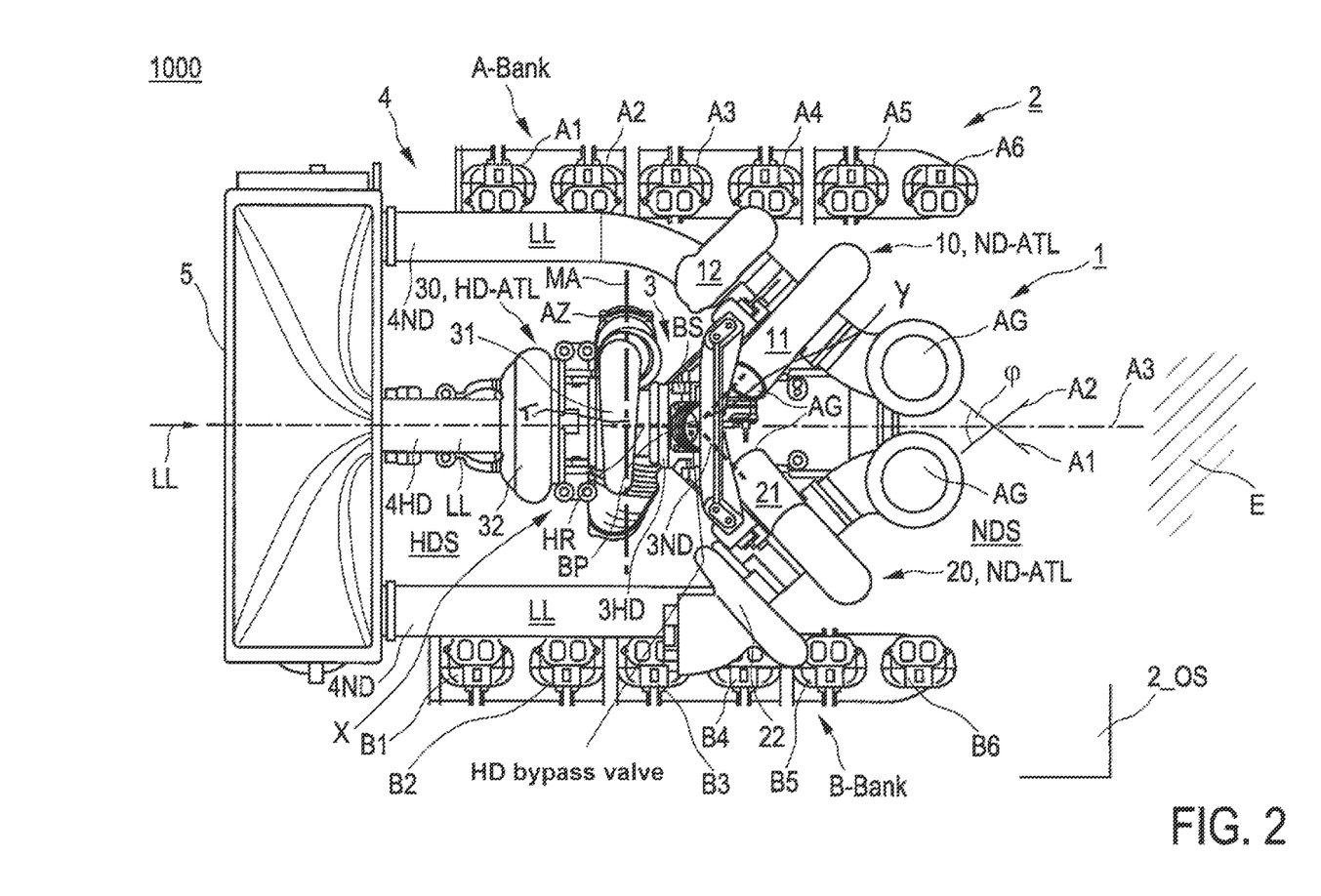
FIG. 2 shows an optional embodiment of an exhaust-gas turbocharger arrangement, for example for an internal combustion engine of FIG. 1, including three exhaust-gas turbochargers for supercharging the internal combustion engine and for arranging above the engine top side of the engine.

FIG. 2 shows, in detail, an exhaust-gas turbocharger arrangement 1 in its specific design as an optional embodiment, implemented in accordance with the concept of the present invention, of the exhaust-gas turbocharging group 100 as schematically illustrated in FIG. 1; the exhaust-gas turbocharger arrangement 1 thus implements the exhaust-gas supercharging group 100, in terms of its spatial and structural implementation with regard to what is needed in the art, in an optional embodiment in accordance with the concept of the present invention.

The exhaust-gas turbocharger arrangement 1 of FIG. 2, together with the engine 2 that can be seen in plan view, is to be understood as a particular embodiment of the internal combustion engine 1000 that is schematically illustrated in FIG. 1. FIG. 2 thus shows an internal combustion engine 1000 according to the concept of the present invention, having the exhaust-gas turbocharger arrangement 1 and the engine 2, in a structural design according to anoptional embodiment with regard to what is needed in the art.

It is possible to see the engine 2, which has an A-bank and a B-bank, illustrated here as an A-bank having in this case six cylinders A1, A2, A3, A4, A5 and A6 and as a B-bank also having in this case six cylinders B1, B2, B3, B4, B5 and B6. The engine 2 thus has a 12-cylinder V engine block, which is modified in relation to the engine block 210 of FIG. 1, with an A-bank and a B-bank each having six cylinders.

Figure 3:
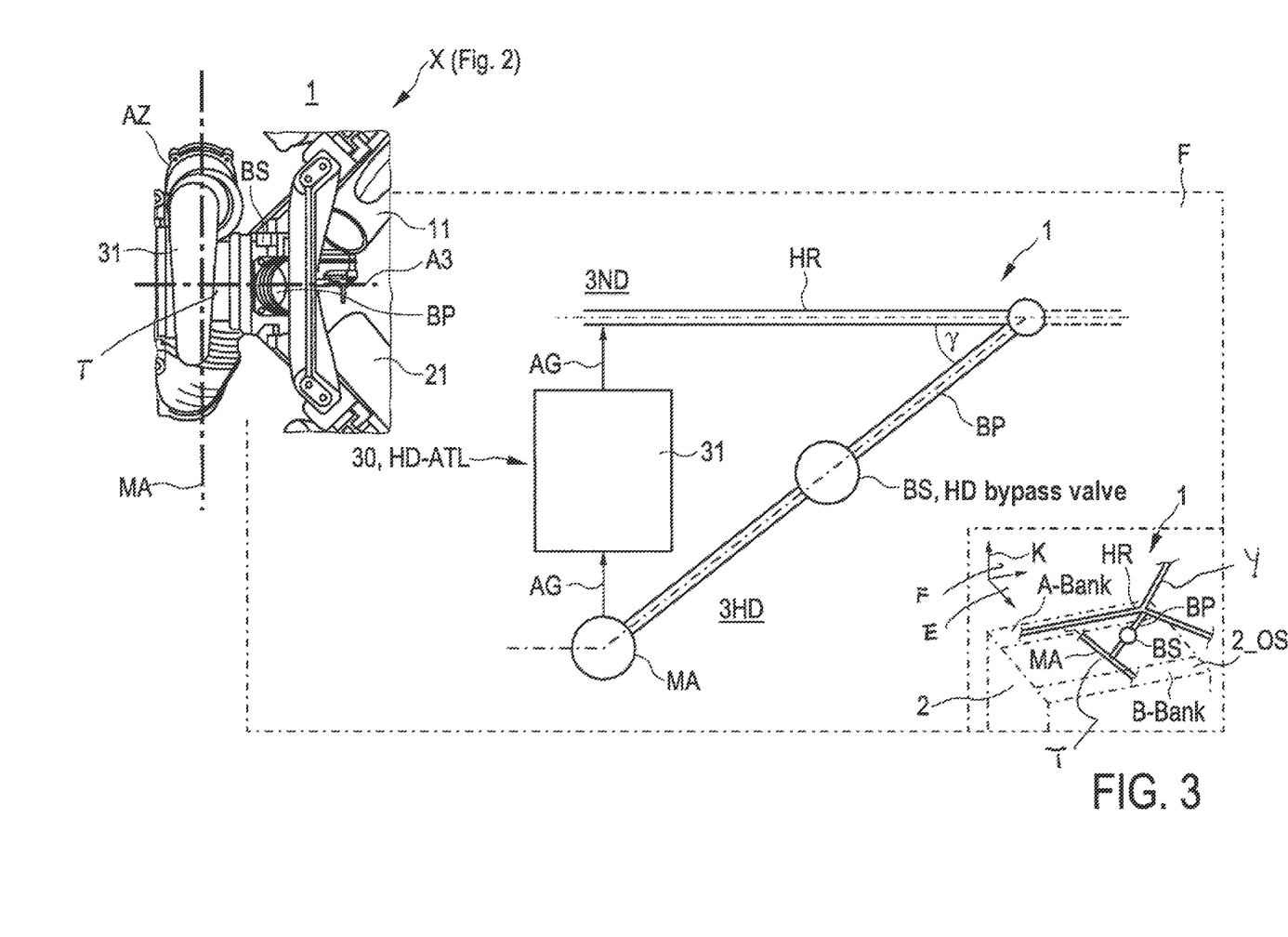
FIG. 3 shows a diagram of the geometry of the arrangement of the high-pressure stage bypass line having a bypass control element situated in a part running below the bifurcated pipe—this relating to the detail X of FIG. 2—in a side view and in a perspective view.

The engine 2 has an engine top side 2_OS, which is schematically illustrated in FIG. 2 and also in the diagram of FIG. 3. In relation to a three-dimensional coordinate system K, the exhaust-gas turbocharger arrangement 1 is thus arranged, as can be seen, above the engine top side 2_OS of the engine 2, that is to say above the cylinder top sides of the A-bank and B-bank. As can be seen from FIG. 2, the exhaust-gas turbocharger arrangement 1 has in this case three exhaust-gas turbochargers, specifically a high-pressure exhaust-gas turbocharger 30 (HD-ATL) of a high-pressure stage HDS and a first and a second low-pressure exhaust-gas turbocharger 10, 20 (ND-ATL) of a low-pressure stage NDS.

As can also be seen, the exhaust-gas turbocharger arrangement 1 has an exhaust-gas conduit 3. Here, the exhaust-gas conduit 3 will also be discussed with reference to a high-pressure conduit 3HD and low-pressure conduit 3ND which are illustrated in more detail in the following FIG. 4 and FIG. 5 but which are at least shown schematically in FIG. 3.

Nevertheless, as can also be seen from FIG. 2, the exhaust-gas turbocharger arrangement 1 has a charge-air conduit 4 having a low-pressure part 4ND and having a high-pressure part 4HD for conducting charge air LL out of an intake manifold 5.

As can be seen, for the intake of charge air LL via the intake manifold 5—and the low-pressure part 4ND and the high-pressure part 4HD of the charge-air conduit 4—a first and a second low-pressure compressor 12, 22 of the first and of the second low-pressure exhaust-gas turbocharger 10, 20 are correspondingly provided, along with a high-pressure compressor 32 of the high-pressure exhaust-gas turbocharger 30.

As can correspondingly be seen, the first and the second low-pressure exhaust-gas turbocharger 10, 20 have a first and a second low-pressure turbine 11, 21 which are provided for driving the low-pressure compressor 12, 22 and which are driven by exhaust gas AG that is conducted in the low-pressure conduit 3ND, that is to say in the low-pressure part of the exhaust-gas conduit 3. Correspondingly, the high-pressure exhaust-gas turbocharger 30 has a high-pressure turbine 31 that is driven in order to drive the high-pressure compressor 32 for exhaust gas AG in the high-pressure conduit 3HD.

This structural arrangement of the exhaust-gas turbochargers 10, 20, 30 of the low-pressure stage NDS and HDS, realized in accordance with the diagram of FIG. 1, is optionally symmetrical by virtue of the three exhaust-gas turbochargers 10, 20, 30 being arranged approximately in the corners of a triangle and in a plane. Specifically, the two charger axes A1, A2 of the first and of the second low-pressure exhaust-gas turbocharger 10, 20 are arranged in an angle range of between 550 and 1000 with respect to one another, wherein the angle φ (phi) is in the present case somewhat less than 90°. The charger axis A3 of the high-pressure exhaust-gas turbocharger 30 lies within this angle range p. As can be seen from the arrangement of the compressors 12, 22, 32 and turbines 11, 21, 31, the charger axes A1, A2, A3 are thus arranged in a plane E that is oriented substantially parallel to the engine top side 20OS.

The following explanations relate to the exhaust-gas conduit 3 for conducting exhaust gas AG.

The low-pressure conduit 3ND, which is merely schematically illustrated in FIG. 2 and which is part of the exhaust-gas conduit 3, is realized in the present case as a bifurcated pipe HR. The bifurcated pipe HR thus at any rate partially implements a low-pressure exhaust-gas feed from the high-pressure stage HDS to the low-pressure stage NDS; the bifurcated pipe HR thus runs between the high-pressure exhaust-gas turbocharger 30 of the high-pressure stage HDS and the first and second low-pressure exhaust-gas turbochargers 10, 20 of the low-pressure stage NDS.

As can also be seen in FIG. 2, the high-pressure conduit 3HD is formed as a high-pressure part of the exhaust-gas conduit 3; said high-pressure conduit at any rate partially includes a schematically depicted engine exhaust-gas conduit MA (below the high-pressure exhaust-gas turbocharger 30) and a high-pressure stage bypass line BP that is connected to the engine exhaust-gas conduit MA (below the high-pressure exhaust-gas turbocharger 30). The high-pressure stage bypass line BP is connected at a first end to the engine exhaust-gas conduit MA and at a second end to the bifurcated pipe HR. The high-pressure stage bypass line BP furthermore has a bypass control element BS that has already been shown in FIG. 2. The high-pressure stage bypass line BP thus has the bypass control element BS in a part running below the bifurcated pipe HR.

This situation is schematically depicted once again in the detail X—as just described—in the inset at the top left of FIG. 3.

Here, FIG. 3 shows, in a side view of an area F that is spanned by the bifurcated pipe HR and high-pressure stage bypass line BP, precisely that bifurcated pipe HR and the high-pressure stage bypass line BP with bypass control element BS as described above. It can also be seen in said figure that the high-pressure stage bypass line BP has the bypass control element BS in the part running below the bifurcated pipe HR. The high-pressure stage bypass line BP is connected at a first end to the engine exhaust-gas conduit MA and at a second end to the bifurcated pipe HR. Precisely this diagram with the bifurcated pipe HR, the high-pressure bypass line BP and the engine exhaust-gas conduit MA is illustrated three-dimensionally in the bottom right-hand part of the illustration in FIG. 3.

It can be seen in FIG. 3 that the high-pressure stage bypass line BP, together with the bifurcated pipe HR, spans the area F, which lies substantially perpendicular to the engine top side 2_OS or the plane E, as discussed above. That is to say, the high-pressure stage bypass line adjoins the bifurcated pipe with an angle of inclination that is denoted here by γ (gamma)—the angle of inclination γ lies in the range between 300 and 60°, and γ is optionally greater than 45°.

It can be schematically seen in the inset in FIG. 3 that, as seen in a plan view, the bifurcated pipe HR has a substantially Y-shaped form, and the bridge line of the engine exhaust-gas conduit MA together with the high-pressure stage bypass line BP have a substantially T-shaped form in a plan view or along said angle of inclination. Here, for reference, the stem of the Y-shaped form and the stem of the T-shaped form are situated one below the other substantially in a plane, that is to say the area F. The branches of the Y-shaped form and the bars of the T-shaped form are arranged on opposite sides, so to speak, as can be seen in the inset in FIG. 3.

Figure 4:
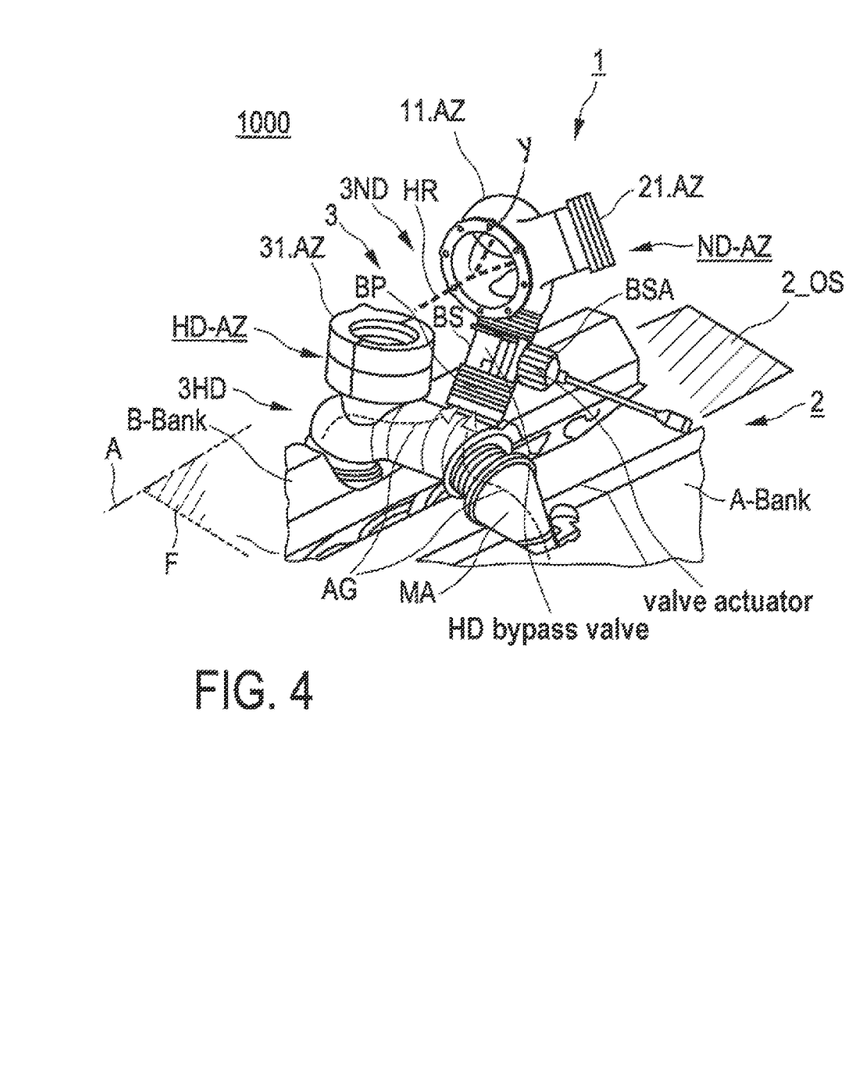
FIG. 4 shows a detail of the embodiment shown in FIG. 2, for the purposes of providing a perspective illustration of the high-pressure stage bypass line having a bypass control element situated in the part running below the bifurcated pipe.

FIG. 4 shows, in a perspective oblique view, a detail of the exhaust-gas turbocharger arrangement 1, connected in turn to the engine 2 of the internal combustion engine 1000, wherein the engine is shown in part here, with the A-bank and B-bank as already discussed further above and with its engine top side 2_OS.

In the perspective view, FIG. 4 shows in particular the high-pressure conduit 3HD, that is to say high-pressure part of the exhaust-gas conduit 3, in detail. The bifurcated pipe HR as part of the low-pressure conduit 3ND, that is to say low-pressure part of the exhaust-gas conduit 3, is shown here only schematically in order to provide a clear view of the details of the high-pressure conduit 3HD.

As can be seen in FIG. 4, the high-pressure conduit 3HD has the engine exhaust-gas conduit MA as discussed above, which is designed to discharge exhaust gas AG from the engine 2—that is to say specifically from the cylinders A1 to A6 and B1 to B6 of the A-bank and B-bank respectively, and to enable the exhaust gas AG to be fed to the exhaust-gas turbocharger arrangement 1.

From FIG. 4, it can now also be seen that the engine exhaust-gas conduit MA is formed as a bridge line above the engine top side 2-OS between the A cylinder bank (A-bank) and B cylinder bank (B-bank), wherein the A cylinder bank and B cylinder bank lie exactly at the engine top side 2_OS or define same in the form of an upper planar border. The bridge line of the engine exhaust-gas conduit MA is formed in a bow shape, in the form of an inverted "U", between the A-bank and B-bank, with in each case one limb of the U-shaped form leading into the manifold (not designated in any more detail) of the A-bank and of the B-bank respectively. Specifically, this is implemented such that exhaust gas AG from the A-bank, via a first limb of the U-shaped bridge line of the engine exhaust-gas conduit MA, and exhaust gas from the B-bank, via a second (the other) limb of the U-shaped bridge line of the engine exhaust-gas conduit MA, are merged in a region of the engine exhaust-gas conduit MA between the A-bank and B-bank.

It can be seen from FIG. 4 that the high-pressure exhaust-gas conduit 3HD furthermore has a high-pressure exhaust-gas feed HD-AZ, which is visible here and which adjoins the engine exhaust-gas conduit 3HD in the transverse region of the U-shaped bow. By way of the high-pressure exhaust-gas feed HD-AZ, exhaust gas AG in the high-pressure region can be fed to the high-pressure exhaust-gas turbocharger 30, that is to say to the turbine 31 thereof. The high-pressure exhaust-gas feed HD-AZ to the turbine 31 of the high-pressure exhaust-gas turbocharger 30—specifically to the connection 31.AZ to the high-pressure turbine 31 of the high-pressure exhaust-gas turbocharger 30—can also be seen in FIG. 2 in the plan view of the exhaust-gas turbocharger arrangement 1. In the present case, FIG. 4 shows only that connection 31.AZ of the high-pressure turbine 31 of the high-pressure exhaust-gas turbocharger 30.

Furthermore, the high-pressure conduit 3HD has a high-pressure stage bypass line BP which is connected to the engine exhaust-gas conduit MA and by way of which exhaust gas AG from the engine exhaust-gas conduit MA in the high-pressure region can be fed, bypassing the high-pressure exhaust-gas turbocharger 30—that is to say bypassing the high-pressure turbine 31—directly to the bifurcated pipe HR. The exhaust gas can thus be fed to the low-pressure stage NDS, or the exhaust gas can be fed to the first and the second low-pressure turbine 11, 21 of the high-pressure exhaust-gas turbocharger 10, 20 simultaneously, without previously impinging on the high-pressure turbine 31. As already mentioned, the bifurcated pipe HR is formed as part of the low-pressure exhaust-gas feed ND-AZ to the first and the second low-pressure exhaust-gas turbocharger 10, 20. Through the bifurcated pipe HR, exhaust gas can be fed from the high-pressure exhaust-gas turbocharger 30, or specifically the high-pressure turbine 31, to the first and the second low-pressure exhaust-gas turbocharger 10, 20, or specifically the low-pressure turbines 11, 21, simultaneously.

It is thus achieved that, owing to the design of the engine exhaust-gas conduit MA in the form of a bridge line above the engine top side 2_OS, a relatively long settling path is realized, in particular in the transverse region of the bridge line of the engine exhaust-gas conduit MA.

This region that acts as a "settling path" for the exhaust gas AG, before the exhaust gas bypass line BP leads away from the bridge line of the engine exhaust-gas conduit MA, has the effect that exhaust-gas pulsation forces have already abated before they act on a bypass control element BS in the exhaust-gas bypass line BP. The exhaust gas AG thus passes, relatively free from pulsations, into the exhaust-gas bypass line, but in particular, the exhaust-gas pulsations have abated to a relatively great degree before they act on the bypass control element that is arranged in the bypass line.

In the present case, the bypass control element BS is arranged in that part of the high-pressure stage bypass line BP which runs below the bifurcated pipe HR. The bypass control element BS is designed in the present case as a bypass valve that is designed to prevent a flow of exhaust gas AG through the high-pressure stage bypass line BP. For this purpose, the bypass valve is explicitly indicated in FIG. 2, FIG. 3 and FIG. 4 as a high-pressure bypass valve with the designation "HD bypass valve".

The bypass control element BS furthermore has a control element actuator BSA which can be seen in FIG. 4 and which is arranged, on a side facing away from the bifurcated pipe HR, below the high-pressure stage bypass line BP and to which the bypass control element BS, that is to say in the present case the bypass valve, is functionally connected. In the present case, the control element actuator BSA is designed as an electric motor or similar actuator for opening or closing the bypass valve as desired. The illustration in FIG. 4 shows the connection pieces 11.AZ and 21.AZ of the low-pressure exhaust-gas feed ND-AZ to the first and the second low-pressure turbine 11, 21 of the low-pressure exhaust-gas turbochargers 10, 20.

That is to say, at the side of the low-pressure stage NDS, the Y-pipe HR has in each case one connection piece or similar connection 11.AZ, 21.AZ of the low-pressure exhaust-gas feed ND-AZ to a low-pressure exhaust-gas turbocharger 10, 20. The high-pressure exhaust-gas feed HD-AZ in the high-pressure region to the high-pressure turbocharger 30 is situated on the engine exhaust-gas conduit MA.

On the other side of the bifurcated pipe, the bifurcated pipe HR adjoins the exhaust-gas outlet of the high-pressure turbine 31 of the high-pressure turbocharger 30, wherein the high-pressure turbine 31 is arranged between the connection piece, or similar connection, denoted by 31.AZ and the inlet of the bifurcated pipe HR.

Figure 5:
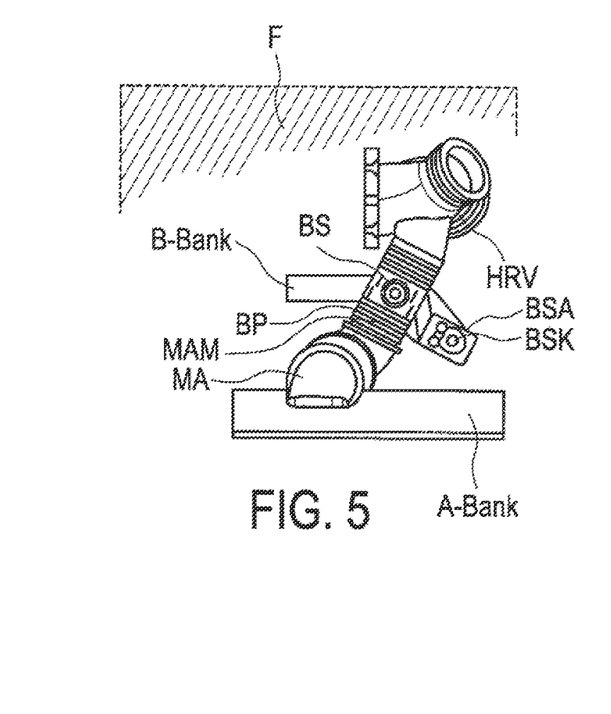
FIG. 5 shows a detail of the embodiment shown in FIG. 2, for the purposes of providing a side view of the high-pressure stage bypass line having a bypass control element situated in the part running below the bifurcated pipe, and the actuator and cooling system connected to said bypass control element.

With regard to the bypass control element BS, FIG. 5 furthermore shows, with respect to the control element actuator BSA in the bypass line BP, that the actuator is connected to a cooling system. The bypass control element correspondingly has cooling connections BSK to the cooling system. Here, the cooling connections BSK are arranged so as to face away from the engine top side 2_OS; in the present case, the cooling connections BSK point out of the plane of the drawing, and thus face laterally away from the hot engine top side 2_OS.

The cooling connections BSK for the control element actuator BSA thus face away from the center of the engine block 2. Furthermore, the valve position is situated centrally in the middle above the water jacket for the cooling connections BSK. This has the effect not only that relatively short cooling water lines can be used but also that, owing to the fact that the bypass control element BS is positioned close to the center, the vibration load even under the action of the exhaust-gas pulsations that are still present is reduced.

Nevertheless, the control element actuator BSA, together with the cooling connections BSK of the bypass control element BS, is arranged below the high-pressure stage bypass line BP and thus, like the high-pressure stage bypass line BP itself, in a part running below the bifurcated pipe HR. It is thus ensured that lever forces cannot act on the high-pressure stage bypass line BP itself or on the bypass control element BS, because these thus remain in a spatial region between the A cylinder bank and the B cylinder bank, in particular below the bifurcated pipe HR, specifically under the high-pressure stage bypass line BP, which is in turn arranged below the bifurcated pipe HR. The bypass control element BS is thus offset toward the engine center and is thus subjected to relatively small movement amplitudes in relation to a peripheral position, for example at the edge of the engine.

The high-pressure bypass valve, that is to say specifically the control element actuator BSA with cooling connections BSK, is arranged below the bifurcated pipe HR toward the center of the engine, and said control element unit is thus exposed only to an exhaust-gas stream exhibiting pulsations that have already decayed owing to the lengthened design of the engine exhaust-gas line MA; said control element unit is thus subjected to only reduced pulsation forces of the exhaust gas AG.

Furthermore, as can be seen from FIG. 5 (without reference signs), the bypass line BP is formed with corresponding vibration dampers, visible here as corrugated collars and corrugated sleeves. Vibrations can thus be dampened and absorbed in particular in this region.

Altogether, the design of the exhaust-gas turbocharger arrangement 1 has been kept relatively compact; the bypass valve is situated directly below the bifurcated pipe HR in the bypass line BP. Altogether, the sum of the measures with the relatively long settling path for the exhaust gas AG in the engine exhaust-gas conduit MA has the effect that the exhaust-gas pulsations have already decayed and, accordingly, only forces that have already decreased considerably act on a relatively compact arrangement with reduced lever arms.

This results in a considerable reduction of the wear load; the life cycle costs (LCC burden) are correspondingly reduced. Limitation of downtime of the central component not only of the bypass line but in particular of the bypass control element BS is greatly enhanced.

Specifically, it can be seen in particular from FIG. 5 that the bypass line BP from the bridge line of the engine exhaust-gas conduit MA thus points away from the engine top side 2_OS; the bypass line BP leads away upward, or obliquely upward, to the bifurcated pipe HR. The high-pressure stage bypass line BP does not extend beyond the edge of a spatial region between the A cylinder bank (A-bank) and B cylinder bank (B-bank) but remains below the region, running thereabove, of the bifurcated pipe HR. Lever effects on the bypass line are thus avoided, because said bypass line does not offer any lever that can be engaged in a lateral direction.

In the embodiment described here, as can be seen in FIG. 4, the high-pressure stage bypass line BP leads away in particular from the center of the bridge line of the exhaust-gas conduit MA and furthermore adjoins the branching point HRV of the bifurcated pipe HR; the branching point HRV is situated approximately at the fork of the Y-shaped form of the bifurcated pipe HR.

The high-pressure stage bypass line BP thus runs obliquely upward approximately from the center MAM of the bridge of the exhaust-gas conduit MA to the branching point HRV. The high-pressure stage bypass line BP is thus arranged centrally above the engine block, such that it is subjected to the smallest movement amplitudes in this region. This is in relation to eccentrically arranged lines.

It has been found that the eccentric placement of an actuator BSA, as has occasionally been optional in the prior art, has disadvantages, which are eliminated by way of the present concept.

LIST OF REFERENCE SIGNS

1 Exhaust-gas turbocharger arrangement
2-OS Engine top side
2 Engine
3 Exhaust-gas conduit
3HD High-pressure conduit, high-pressure part of the exhaust-gas conduit 3
3ND Low-pressure conduit, low-pressure part of the exhaust-gas conduit 3
4 Charge-air conduit
4HD High-pressure conduit, high-pressure part of the charge-air conduit 4
4ND Low-pressure conduit, low-pressure part of the charge-air conduit 4
5 Intake manifold
10, 20 First, second low-pressure exhaust-gas turbocharger, ND-ATL
11, 21, 31 Turbines
12, 22 First, second low-pressure compressor of the first and the second low-pressure exhaust-gas turbocharger 10, 20
30 High-pressure exhaust-gas turbocharger, HD-ATL
32 High-pressure compressor of the HD-ATL 30
HD-AZ High-pressure exhaust-gas feed to the turbine 31 of the HD--0
31.AZ Connection to the high-pressure turbine 31 of the HD-ATL 30
1000 Internal combustion engine
100 Exhaust-gas turbocharging group
110 First exhaust-gas turbocharger
111 First compressor
112 First turbine
120 Second exhaust-gas turbocharger
121 Second compressor
122 Second turbine
130 High-pressure exhaust-gas turbocharger, third exhaust-gas turbocharger
131 Third compressor
132 Third turbine
2, 200 Engine
210 Engine block
220A, 220B Charge-air manifold
230A, 230B Exhaust manifold
300 Charger conduit system
310 Charge-air conduit
311 First charge-air conduit
312 Second charge-air conduit
321 First exhaust-gas conduit
322 Second exhaust-gas conduit
320 Exhaust-gas conduit
400 Vehicle controller
410 Charger control module
411, 412 Control lines
420 Transmission control module
430 Data bus
440 Steering system controller
500 Transmission
AG Exhaust gas
LL Charge air
A1 . . . A5 (A-)cylinders A1 . . . A5 of the A-bank
B1 . . . B5 (B-)cylinders B1 . . . B5 of the B-bank LL, AG Charge air, exhaust gas
nATL1, nATL2 Rotational speed of the first and of the second exhaust-gas turbocharger ATL1, ATL2
VTG1, VTG2 Variable turbine geometry of the first and of the second exhaust-gas turbocharger ATL1, ATL2
A1, A2, A3 Charger axes
E Plane
F Surface
BP High-pressure stage bypass line
BS Bypass control element
HR Bifurcated pipe
HDS High-pressure stage
MA Engine exhaust-gas conduit
MAM Center of the bridge of the exhaust-gas conduit MA
NDS Low-pressure stage
ND-AZ Low-pressure exhaust-gas feed
11.AZ, 21.AZ Connection pieces to the low-pressure turbine
HD bypass valve High-pressure bypass valve
γ (gamma) Angle of inclination
BSA Control element actuator
BSK Cooling connections for the control element actuator BSA
HRV Y branching point; Y-shaped form
T T-shaped form
LCC Life cycle costs While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An exhaust-gas turbocharger arrangement of an internal combustion engine, the exhaust-gas turbocharger arrangement comprising:
   three exhaust-gas turbochargers configured for supercharging the internal combustion engine and for being arranged above an engine top side of an engine of the internal combustion engine, the three exhaust-gas turbochargers being a high-pressure exhaust-gas turbocharger, a first low-pressure exhaust-gas turbocharger, and a second low-pressure exhaust-gas turbocharger;
   a high-pressure stage, which includes the high-pressure exhaust-gas turbocharger;
   a low-pressure stage, which includes the first low-pressure exhaust-gas turbocharger and the second low-pressure exhaust-gas turbocharger; and
   an exhaust-gas conduit, which includes a high-pressure conduit, a low-pressure conduit, and a high-pressure stage bypass, the low-pressure conduit including a bifurcated pipe between the high-pressure exhaust-gas turbocharger of the high-pressure stage and the first low-pressure exhaust-gas turbocharger and the second low-pressure exhaust-gas turbocharger of the low-pressure stage, the high-pressure conduit including an engine exhaust-gas conduit and a high-pressure stage bypass line, the high-pressure stage bypass line including a first end and a second end and being connected at the first end to the engine exhaust-gas conduit and at the second end to the bifurcated pipe, the high-pressure stage bypass line further including a part running below the bifurcated pipe and a bypass control element in the part of the high-pressure stage bypass line running below the bifurcated pipe.

2. The exhaust-gas turbocharger arrangement according to claim 1, wherein the bypass control element in the part running below the bifurcated pipe is a bypass valve that is configured for preventing a flow of an exhaust gas through the high-pressure stage bypass line.

3. The exhaust-gas turbocharger arrangement according to claim 2, wherein the bypass control element includes a control element actuator which, arranged under the high-pressure stage bypass line on a side of the bypass control element facing away from the bifurcated pipe, is functionally connected to the bypass control element.

4. The exhaust-gas turbocharger arrangement according to claim 3, wherein the bypass control element includes a plurality of cooling connections for the control element actuator, the plurality of cooling connections being arranged on a side of the bypass control element facing away from the engine top side.

5. The exhaust-gas turbocharger arrangement according to claim 2, further comprising a high-pressure exhaust-gas feed, wherein the exhaust-gas turbocharger arrangement is configured such that the exhaust gas is discharged from the engine and is fed to the exhaust-gas turbocharger arrangement by way of the engine exhaust-gas conduit, and wherein the engine exhaust-gas conduit is adjoined by the high-pressure exhaust-gas feed which is configured for being that by way of which the exhaust gas is conducted in a high-pressure region of the exhaust-gas turbocharger arrangement to the high-pressure exhaust-gas turbocharger.

6. The exhaust-gas turbocharger arrangement according to claim 2, wherein the bifurcated pipe forms a low-pressure exhaust-gas feed to the first low-pressure exhaust-gas turbocharger and the second low-pressure exhaust-gas turbocharger, wherein the low-pressure exhaust-gas feed is configured for being that by way of which the exhaust gas from the high-pressure exhaust-gas turbocharger is fed to the first low-pressure exhaust-gas turbocharger and the second low-pressure exhaust-gas turbocharger simultaneously.

7. The exhaust-gas turbocharger arrangement according to claim 2, wherein the high-pressure stage bypass line—which is connected to the engine exhaust-gas conduit—is configured for being that by way of which the exhaust gas is fed in a high-pressure region of the exhaust-gas turbocharger arrangement-bypassing the high-pressure exhaust-gas turbocharger-directly to the bifurcated pipe to the low-pressure stage.

8. The exhaust-gas turbocharger arrangement according to claim 2, wherein the engine exhaust-gas conduit is configured for being formed at the engine top side as a bridge line above the engine top side between an A cylinder bank of the internal combustion engine and a B cylinder bank of the internal combustion engine.

9. The exhaust-gas turbocharger arrangement according to claim 8, wherein the high-pressure stage bypass line leads upwardly away from the engine exhaust-gas conduit and thereby points away from the engine top side to the bifurcated pipe.

10. The exhaust-gas turbocharger arrangement according to claim 8, wherein the high-pressure stage bypass line leads upwardly away from the bridge line and thereby points away from the engine top side to the bifurcated pipe.

11. The exhaust-gas turbocharger arrangement according to claim 2, wherein the high-pressure stage bypass line runs in a spatial region of the internal combustion engine between an A cylinder bank of the internal combustion engine and a B cylinder bank of the internal combustion engine and below the bifurcated pipe, the high-pressure stage bypass line running below the bifurcated pipe so as to remain in a cylinder V of the internal combustion engine between the A cylinder bank and the B cylinder bank.

12. The exhaust-gas turbocharger arrangement according to claim 2, wherein the engine exhaust-gas conduit (MA) includes a center, wherein the bifurcated pipe includes a branching point, and wherein the high-pressure stage bypass line leads away from the center of the engine exhaust-gas conduit and connects to the branching point of the bifurcated pipe.

13. The exhaust-gas turbocharger arrangement according to claim 2, wherein the high-pressure stage bypass line, together with the bifurcated pipe, spans a plane that lies substantially perpendicular to the engine top side, wherein the high-pressure stage bypass line, together with the bifurcated pipe, encloses an angle of inclination that lies in a range between 30° and 60°.

14. The exhaust-gas turbocharger arrangement according to claim 2, wherein the engine exhaust-gas conduit includes a bridge line, wherein the bifurcated pipe has a substantially Y-shaped form as seen in a plan view, wherein the bridge line of the engine exhaust-gas conduit, together with the high-pressure stage bypass line, has a substantially T-shaped form as seen in a plan view, wherein the Y-shaped form includes a stem and a plurality of branches, wherein the T-shaped form includes a stem and a plurality of bars, and wherein the stem of the Y-shaped form and the stem of the T-shaped form lying substantially one below the other in a plane, with the plurality of branches of the Y-shaped form and the plurality of bars of the T-shaped form being situated on opposite sides relative to one another.

15. The exhaust-gas turbocharger arrangement according to claim 2, wherein the three exhaust-gas turbochargers each includes respectively a compressor wheel, a turbine wheel, and a charger axis about which the compressor wheel and the turbine wheel commonly rotate, wherein the three exhaust-gas turbochargers are each arranged such that each of the charger axis lies in a plane, wherein an axis of the bifurcated pipe runs parallel to the plane, wherein the high-pressure stage bypass line runs transversely with respect to the plane, and wherein the plane runs substantially parallel to the engine top side.

16. The exhaust-gas turbocharger arrangement according to claim 2, wherein the three exhaust-gas turbochargers each includes respectively a compressor wheel, a turbine wheel, and a charger axis about which the compressor wheel and the turbine wheel commonly rotate, wherein the three exhaust-gas turbochargers are each arranged such that each of the charger axis lies in a plane, wherein an axis of the bifurcated pipe runs parallel to the plane, wherein the high-pressure stage bypass line runs transversely with respect to the plane, and wherein the plane runs substantially parallel to the engine top side transversely with respect to a surface of the internal combustion engine.

17. The exhaust-gas turbocharger arrangement according to claim 2, wherein the charger axis of the first low-pressure exhaust-gas turbocharger and the charger axis of the second low-pressure exhaust-gas turbocharger lie at an angle with respect to one another in an angle range of between 55° and 100°, and the charger axis of the high-pressure exhaust-gas turbocharger lies within the angle range.

18. An internal combustion engine, comprising:
an engine, including an engine top side and at least one cylinder bank, including a feed air side and an exhaust air side;
an exhaust-gas turbocharger arrangement, including:
three exhaust-gas turbochargers, which are configured for supercharging the internal combustion engine and which are arranged above the engine top side of the engine of the internal combustion engine, the three exhaust-gas turbochargers being a high-pressure exhaust-gas turbocharger, a first low-pressure exhaust-gas turbocharger, and a second low-pressure exhaust-gas turbocharger;
a high-pressure stage, which includes the high-pressure exhaust-gas turbocharger;
a low-pressure stage, which includes the first low-pressure exhaust-gas turbocharger and the second low-pressure exhaust-gas turbocharger; and
an exhaust-gas conduit, which includes a high-pressure conduit, a low-pressure conduit, and a high-pressure stage bypass, the low-pressure conduit including a bifurcated pipe between the high-pressure exhaust-gas turbocharger of the high-pressure stage and the first low-pressure exhaust-gas turbocharger and the second low-pressure exhaust-gas turbocharger of the low-pressure stage, the high-pressure conduit including an engine exhaust-gas conduit and a high-pressure stage bypass line, the high-pressure stage bypass line including a first end and a second end and being connected at the first end to the engine exhaust-gas conduit and at the second end to the bifurcated pipe, the high-pressure stage bypass line further including a part running below the bifurcated pipe and a bypass control element in the part of the high-pressure stage bypass line running below the bifurcated pipe; and
a feed air conduit, wherein the exhaust-gas turbocharger arrangement, so as to supercharge the internal combustion engine, is connected via the feed air conduit to the feed air side of the at least one cylinder bank of the engine and is connected via the engine exhaust-gas conduit to the exhaust air side of the at least one cylinder bank of the engine, the exhaust-gas turbocharger arrangement being arranged above the engine top side of the engine.

19. The exhaust-gas turbocharger arrangement according to claim 1, wherein the part defines a first central axis, the bifurcated pipe defines a second central axis, the first central axis runs below the second central axis when the first central axis, the second central axis, the part, and the bifurcated pipe pass through a vertical plane simultaneously.

20. The internal combustion engine according to claim 18, wherein the part defines a first central axis, the bifurcated pipe defines a second central axis, the first central axis runs below the second central axis when the first central axis, the second central axis, the part, and the bifurcated pipe pass through a vertical plane simultaneously.

* * * * *